UNITED STATES PATENT OFFICE.

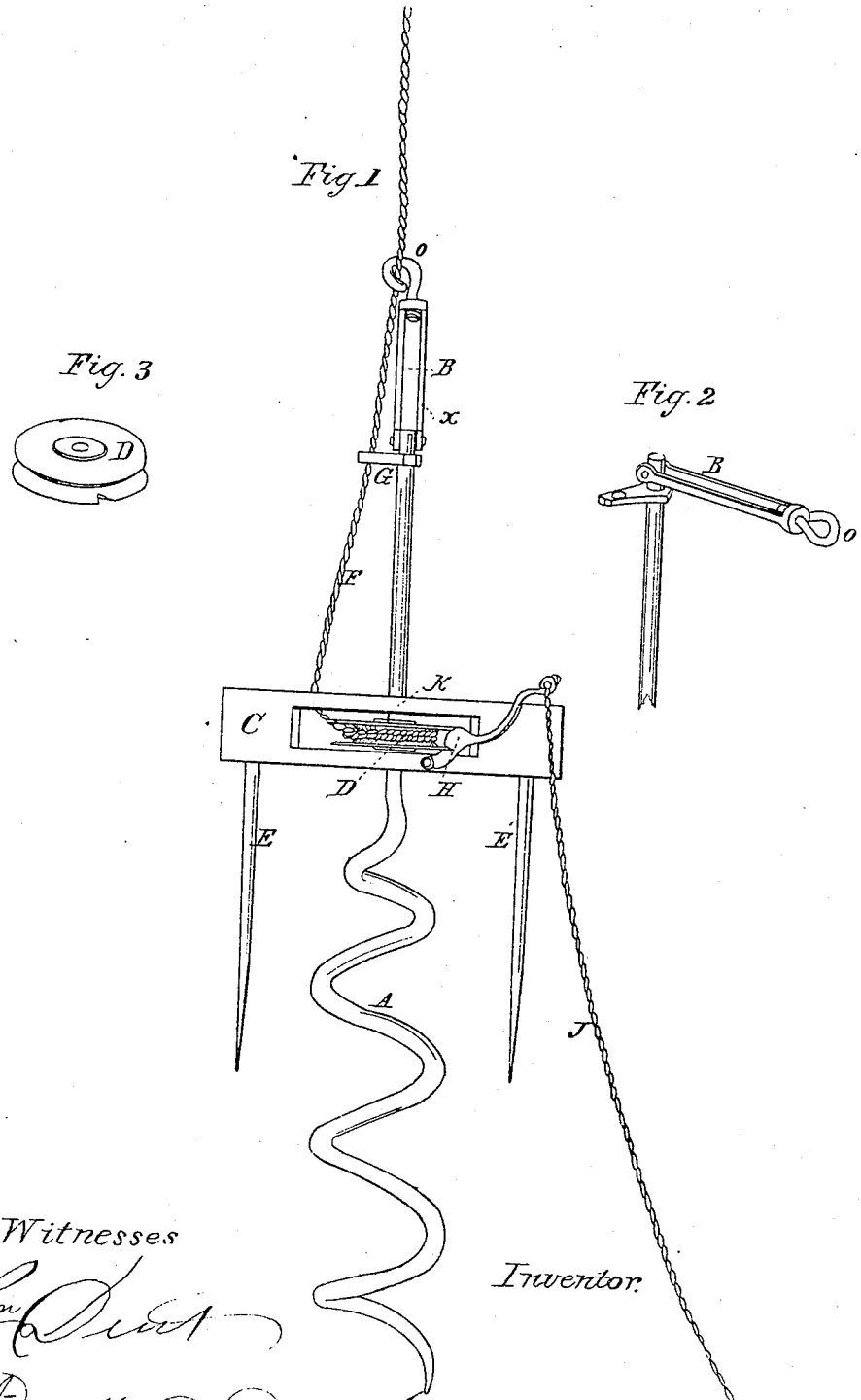

JOHN F. PIERCE, OF HOLLAND PATENT, NEW YORK, ASSIGNOR TO HIMSELF, ISAAC PIERCE, AND JAMES S. HALL, OF SAME PLACE.

IMPROVEMENT IN HORSE HAY-FORKS.

Specification forming part of Letters Patent No. 53,085, dated March 6, 1866.

*To all whom it may concern:*

Be it known that I, JOHN F. PIERCE, of Holland Patent, county of Oneida and State of New York, have invented a new and useful Machine for Unloading Hay from the Wagon; and I do hereby declare that the following is a full, clear, and exact description of the construction and operation of the same, reference being had to the annexed drawings, making a part of this specification.

My invention consists in the use of a spiral shaft furnished with a sheave, swivel-head, and jointed arm and used in combination with a head-piece furnished with tines, said spiral shaft being made operative by means of said jointed arm, sheave, and hoisting-rope, the whole being constructed, arranged, and operating in the manner hereinafter described.

To enable others skilled in the art to make and use my invention, I will proceed to describe its construction and operation.

In the accompanying drawings, Figure 1 represents a perspective view of my improved machine for unloading hay from the wagon. Fig. 2 represents the swivel-head o, jointed arm B, on the upper end of the spiral shaft A. Fig. 3 represents a perspective view of the sheave or pulley used in connection with the hoisting-rope for operating the spiral shaft A.

In the drawings, A represents the spiral shaft. B represents the jointed arm, which is hinged at the point marked x, and is furnished with a swivel-head, (marked o.) The spiral shaft A passes up through openings made in the center of the head-piece, (marked C,) in which is also an opening (marked K) for the sheave, (marked D,) which is secure on the spiral shaft A.

To the sheave D is attached the hoisting-rope F, which passes up through an opening in the head-piece C, guide G, and the ring of the swivel-head o to the hoisting-gear.

In the outer edge of the sheave D is made a notch (marked i) for the pawl H, which is secured to the head-piece C. To this pawl H is attached a cord, J, which is used for unshipping the pawl from the sheave. The pawl may be held in contact with the sheave by means of a suitable spring or other device. The head-piece C is furnished with two tines or prongs, which are used for binding the hay to the spiral shaft A.

Having all things constructed and arranged as herein described and represented, the machine is operated as follows: The pawl H is unshipped from the sheave D, and the jointed arm B is turned down, as represented in Fig. 2. The point of the spiral shaft A is forced into the hay and the spiral shaft is then revolved by means of the arm B, which is used as a crank or lever for that purpose, and the revolving of the shaft A will force or draw the tines E and shaft A down into the hay, and at the same time wind the hoisting-rope F around on the sheave D, and when the spiral shaft A and tines E are forced or drawn down to the desired distance into the hay the pawl H is placed in the notch i of the sheave D, which will prevent the spiral shaft from turning or revolving; then by hoisting or pulling the rope F the whole machine with its load is lifted from the wagon, and when elevated to the desired place the pawl H is then unshipped from the sheave by means of the cord J; then by a continuation of the draft on the hoisting-rope F it will cause the sheave D and the spiral shaft A to revolve in a direction opposite to that given the spiral shaft when entering the hay, and thereby release the machine from its load.

Having thus described the nature, construction, and operation of my improvement, what I claim as of my invention is—

The arrangement of the swivel-head o, jointed arm B, guide G, sheave D, pawl H, spiral shaft A, head-piece C, and tines E, constructed, arranged, and operating substantially as herein described, and for the purpose set forth.

JOHN F. PIERCE.

Witnesses:
CHARLES G. MUDOLE,
JOHN CANDE.